United States Patent [19]

Bost

[11] 4,146,268

[45] Mar. 27, 1979

[54] THREE-POINT SAFETY BELT HAVING BELT COIL-UP MEANS AND A BELT PASSAGE RING ADJACENT THE BELT CLASP

[76] Inventor: Alois Bost, Leopoldstrasse 102, 6685 Schiffweiler 2, Fed. Rep. of Germany

[21] Appl. No.: 843,037

[22] Filed: Oct. 17, 1977

[51] Int. Cl.² .............................................. A62B 35/02
[52] U.S. Cl. ................................................... 297/389
[58] Field of Search ..................... 24/77, 75, 198, 164; 280/747; 297/389, 388

[56] References Cited

U.S. PATENT DOCUMENTS

| | | | |
|---|---|---|---|
| 97,574 | 12/1869 | Wesson | 24/77 R |
| 1,326,158 | 12/1919 | Johnson | 24/164 |
| 1,368,316 | 2/1921 | Zöbl | 24/77 R |
| 3,258,293 | 6/1966 | Sharp | 297/389 |
| 3,262,169 | 7/1966 | Jantzen | 24/77 R |
| 3,486,793 | 12/1969 | Cederberg et al. | 297/389 |

FOREIGN PATENT DOCUMENTS

| | | | |
|---|---|---|---|
| 2143856 | 4/1972 | Fed. Rep. of Germany | 297/389 |
| 1173891 | 12/1969 | United Kingdom | 297/389 |

Primary Examiner—James T. McCall
Attorney, Agent, or Firm—Armstrong, Nikaido, Marmelstein & Kubovcik

[57] ABSTRACT

A three-point safety belt system comprising a safety belt including a pelvis belt portion and a breast belt portion; means for rolling up the belt coupled to the belt; a passage ring on the belt wherein the passage ring divides the pelvis belt portion and the breast belt portion; and clamp means for engaging the pelvis belt portion and the breast belt portion, the clamp means having a first position for permitting the adjustment of the length of the pelvis belt portion and the breast belt portion and the clamp means having a second position adjacent the passage ring for clamping the pelvis belt portion with respect to the breast belt portion thereby preventing the change of lengths of the belt portions.

3 Claims, 9 Drawing Figures

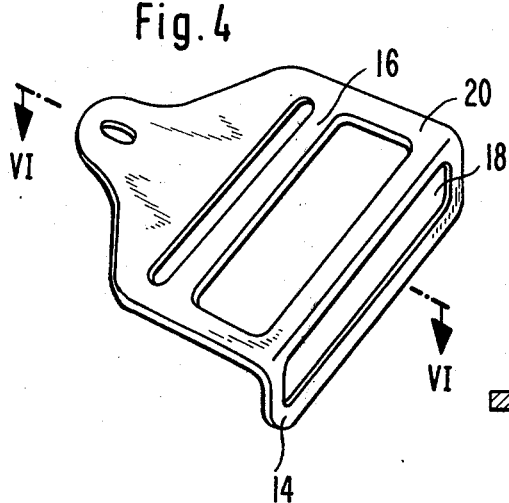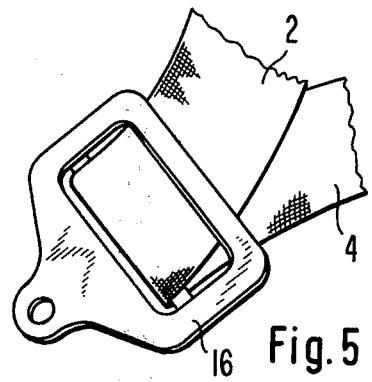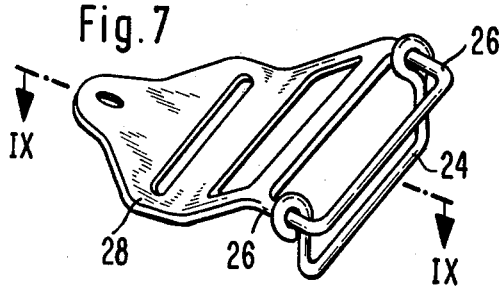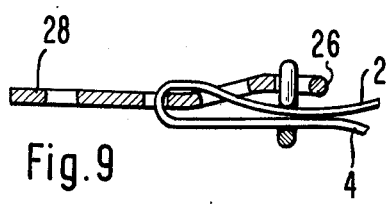

THREE-POINT SAFETY BELT HAVING BELT COIL-UP MEANS AND A BELT PASSAGE RING ADJACENT THE BELT CLASP

BACKGROUND OF THE INVENTION

This invention relates to a safety belt for the passengers of vehicles, especially motor vehicles, and more particularly to a three-point safety belt system comprising a safety belt means for coiling or rolling up the safety belt, an eye-like passage ring through which the safety belt passes and a clasp or buckle serving for fastening the safety belt.

Prior art safety belts of this kind comprising a diagonal shoulder-belt and a horizontal pelvis-belt exhibit serious disadvantages insofar as after the safety belt has been put on, the two belt sections tend to alter their mutually proportional lengths. As a result, during use of the vehicle for a ride the safety belt will be moved back and forth within the passage ring whenever the passengers move or when the ride is unsmooth because e.g. of bumpy roads. Hence the safety belt is not only subjected to permanent wear but also moves from the initially preset favorable position at the pelvis, upwards into the region of the stomach whereupon in a crash the safety belt can cause serious internal injuries. Moreover, in the prior art systems the breast-belt can increase too greatly in length so that in the event an an accident the upper part of the body will be thrown forwards and thus the head will be greatly endangered. Furthermore, a too slack pelvis-belt can result in submarining (dipping through of the pelvis portion) whereby the legs are endangered. Finally, the motoring safety altogether is substantially impaired in that under traffic and touring conditions the driver is compelled to repeatedly readjust the pelvis-belt to the correct length and position whereby his concentration is disturbed.

German Offenlegungsschrift DOS No. 2,143,856 discloses a three-point safety belt without automatic belt coiling-up means wherein the angular position of the breast-belt relative to the pelvis-belt had to be secured by a sleeve which consists of a preferably deformable material having a great elasticity and which simultaneously covers both belt members at least partially while one end thereof abuts a retaining clasp provided in said safety belt and the other end of said sleeve holds the zone of intersection of the two belt members in a preferred safety position. The problem underlying the present invention was neither set nor solved in said known three-point safety belt.

SUMMARY OF THE INVENTION

The object of the invention is to eliminate the drawback in the prior art and to ensure that in a three-point safety belt provided with automatic belt roll-up means and a belt passage eye-like ring adjacent the belt clasp so that the pelvis-belt when in use will always tightly engage the user's body. The object of the invention is accomplished by a clamping device for clamping both the breast-belt and the pelvis-belt with respect to each other in the respective adjusted length of the pelvis-belt with the clamping device positioned adjacent the passage ring. In general, in the case of a three-point safety belt according to the present invention the clamping device may be simultaneously formed as an adjusting means and designed particularly advantageously in the shape of a buckle through which both the breast-belt and the pelvis-belt extend. In this manner, in the safety belt according to the invention the disadvantages of the prior art three-point safety belts are eliminated by a very simple means while the safety belt according to the invention is prevented from constantly sliding back and forth within the belt passage ring and the pelvis-belt is safely secured in its set position. What is essential is that moreover no further adjustment of the safety belt is required when the belt is put on or released and the handling is simplified when the belt is repeatedly put on by the same person because the pelvis-belt length is fixedly adjusted and will be maintained when the belt is detached.

BRIEF DESCRIPTION OF THE DRAWINGS

The invention will be described hereinafter in greater detail with reference to the embodiments shown in the drawings in which:

FIG. 4 shows a second embodiment of the insertion end in a perspective view.

FIG. 5 shows the insertion end of FIG. 4 together with a safety belt.

FIG. 6 shows a sectional view along the line VI—VI in FIG. 4 when the safety belt is being used.

FIG. 7 shows a further embodiment in a view corresponding to FIG. 4.

FIG. 8 shows a detail of the embodiment according to FIG. 7.

FIG. 9 shows a sectional view along the line IX—IX of FIG. 7.

DETAILED DESCRIPTION OF THE PREFERRED EMBODIMENTS

Figure 1:
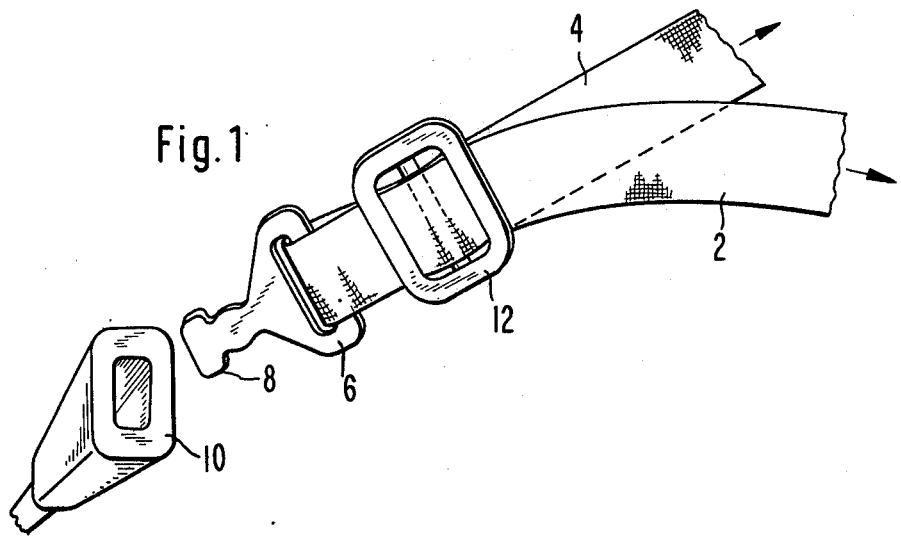
FIG. 1 shows an insertion end of a safety belt according to the invention.
Figure 2:
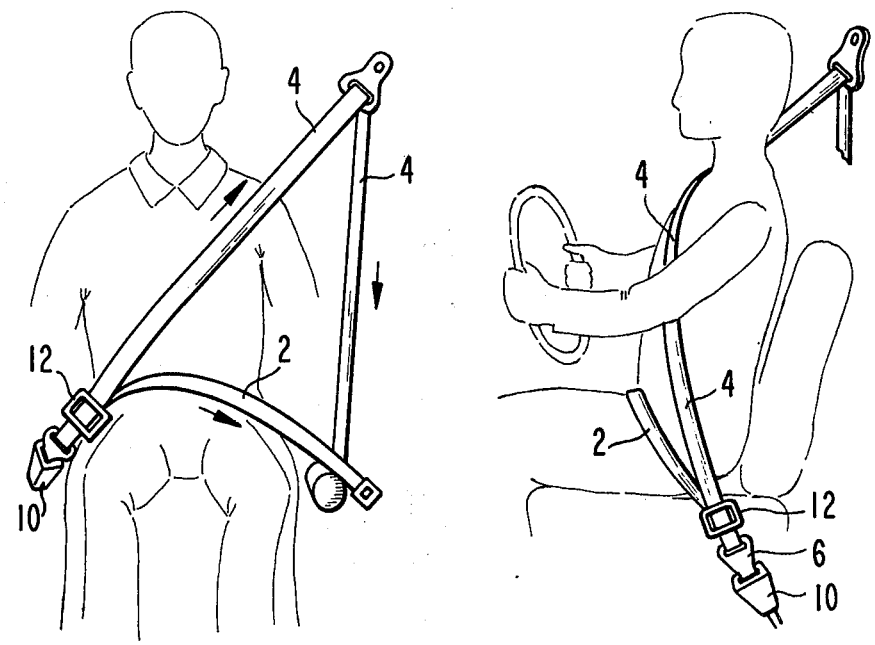
FIG. 2 shows a front view of the safety belt in the condition of use.
Figure 3:
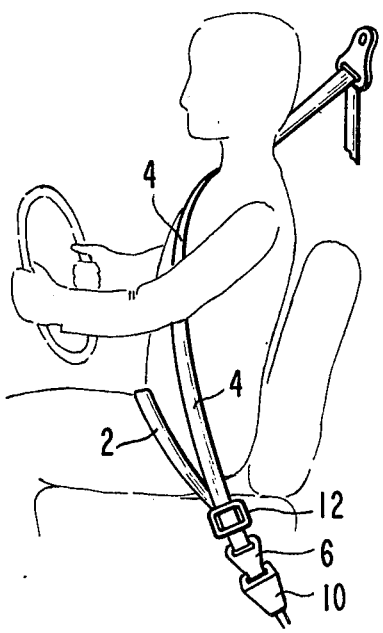
FIG. 3 shows a side view thereof.

Each of the Figures shows a three-point safety belt including a pelvis-belt 2 and a breast-belt 4. The belt formed of the two belt sections 2 and 4 extends through an eye-like passage ring 6 which is provided with an insertion end or plug-in portion 8 for insertion into a conventional snap socket 10. The downwardly extending end of the breast-belt 4 (see the right-hand portion in FIG. 2) is coupled to automatic belt coil-up or roll-up means 30 (see FIG. 2).

According to the invention, adjacent the passage ring 6 is a clamping device 12 for clamping breast-belt 4 and pelvis-belt 2 together in their respective adjusted lengths. The clamping device or locking means 12 does not permit the pulling of the breast-belt 4 upwards in the direction of the arrow and the pulling of the pelvis-belt 2 in the direction of the arrow after the safety belt has been put on and the plug-in portion of passage ring 6 is inserted into snap socket 10. The clamping or locking means 12 may be designed in various other embodiments to simultaneously serve as an adjusting element.

In the embodiment shown in the drawings said clamping means 12 has the shape of a clasp through which breast-belt 4 and pelvis-belt 2 extend. After putting-on of the safety belt and the length of pelvis-belt 2 has been adjusted by the usual pulling of the breast-belt 4, the clasp 12 is drawn or pushed towards and against passage ring 6 whereby clasp 12 will clamp breast-belt 4 and pelvis-belt 2 against each other. Pelvis-belt 2 can therefore no longer unintentionally change its length so that a constant sliding of the belt back and forth within passage ring 6 is avoided.

Thus, pelvis-belt 2 and breast-belt 4 are fixed in the clamping means or clasp 12. The incorporation of clamping or clasp means adjacent the passage ring according to the invention contributes to eliminating the above-mentioned injuries caused by improperly adjusted safety belts.

In the embodiments shown in FIGS. 4 to 6 according to the invention, clamping or clasp means 14 is formed integral with passage ring 16 and comprises a downwardly bent, angled portion of the passage ring 14, which angled portion has a slot 18 through which the ends of the safety belt forming said breast-belt 4 and pelvis-belt 2 are passed after the safety belt has been passed about the web or ridge 20 of said passage ring 14. Whenever a tensile force acts on the pelvis-belt and on the breast-belt, respectively, the desired arrest of the position takes place thanks to the downwardly bent, angled clamping or clasp means 14.

In the embodiment according to FIGS. 7 to 9, said clamping or clasp means 22 comprises a U-shaped bracket 24 slidably supported on studs 26 of passage ring 28 so that as regards to the locking of the safety belt to prevent shifting the bracket 24 operates in a manner comparable to that of the embodiment according to FIGS. 4 to 6.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. A three-point retractable safety belt device for use in a vehicle consisting of
    (a) a unitary safety belt including a pelvis-belt portion and a breast-belt portion one end of the pelvis-belt and one end of the breast-belt portion being fixed to said vehicle;
    (b) retractor means for rolling up said belt, coupled to said belt;
    (c) a passage ring on said belt wherein said passage ring divides said pelvis-belt portion and said breast-belt portion; and
    (d) clamp means for engaging said pelvis-belt portions and said breast-belt portion, said clamp means having a first position for permitting the adjustment of the length of said pelvis-belt portion and said breast-belt portion and said clamp means having a second position adjacent said passage ring for holding said pelvis-belt portion and said breast-belt portion and preventing the changing of length of said pelvis-belt portion with respect to said breast-belt portion.

2. The three-point safety belt system of claim 1 wherein said clamp means is integral with said passage means.

3. The three-point safety belt system of claim 2 wherein said clamp means includes a U-shaped bracket.

* * * * *